Figure 1:
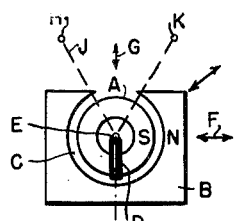

Dec. 4, 1956 D. A. YOUNG 2,773,240
MOVING-COIL ELECTRICAL INSTRUMENTS
Filed Nov. 18, 1950

WITNESSES:
E.A. McCloskey
Nw. L. Groove

INVENTOR
Douglass A. Young.
BY C.L. Freedman
ATTORNEY

United States Patent Office 2,773,240
Patented Dec. 4, 1956

2,773,240

MOVING-COIL ELECTRICAL INSTRUMENTS

Douglass A. Young, East Orange, N. J., assignor to Westinghouse Electric Corporation, East Pittsburgh, Pa., a corporation of Pennsylvania Application November 18, 1950, Serial No. 196,429

13 Claims. (Cl. 324—150)

This invention relates to moving-coil electrical instruments, and it has particular relation to moving-coil electrical measuring instruments wherein a coil side is disposed for rotation in an air gap of a magnetic structure.

In many instruments it has been found desirable to provide an air gap defined by two magnetic pole pieces. A source of magnetomotive force is connected across the pole pieces to establish a magnetic field in the air gap. A moving coil has a coil side disposed in the air gap and is mounted for rotation relative to the magnetic structure. Such instruments have been found useful as relays and in other fields and the invention is applicable thereto. However, the invention is particularly suitable for an electrical measuring instrument of the foregoing type and will be discussed with reference to such a measuring instrument.

In commercial instruments it has been found desirable to maintain extremely small tolerances for the air gap. Such small tolerances have been desired in order to provide a sensitive instrument having an acceptable scale distribution. For optimum sensitivity a small air gap is desirable. However, the air gap must be large enough to provide the required mechanical clearance for the associated coil side.

The maintenance of small tolerances during the manufacture of an instrument is extremely burdensome. Furthermore, the designs of such instruments which have been employed in commercial instruments have made it virtually impossible to correct scale distribution of an instrument in the field.

In accordance with the invention, one of the pole pieces of the instrument is mounted for movement with respect to the other pole piece in order to adjust the shape of the air gap. Although this movement may be one of translation, it has been found particularly desirable to provide a movement of rotation about an axis which is parallel to and spaced from the axis of rotation of the coil. In a preferred embodiment of the invention, a line extending between the two axes, or a plane containing the two axes, passes substantially through a predetermined portion of the air gap. Such predetermined air gap portion preferably corresponds to the full-scale position of the coil side. With such a location of the axes, adjustment of the pole pieces has little effect on the full-scale calibration of the instrument.

A magnetic connection or path between the pole pieces may be established through engaging relatively movable faces which form seats extending transverse to the aforesaid axes. Preferably, clamping means is provided for clamping the pole pieces relative to each other in any desired position of adjustment.

In addition to the foregoing, provision is made for full-load or full-scale calibration of the instrument. Such calibration may be effected in a conventional manner. For example, if the instrument is to be employed as a voltmeter, an adjustable resistor may be connected in series with the coil. When a current corresponding to the current required to produce full-scale deflection of the instrument is passed through the coil and resistor, the adjustable resistor may be adjusted to provide a full-scale instrument reading.

As a further example, if the instrument is employed as an ammeter, an adjustable shunt may be connected across the coil. Adjustment of the shunt then may be employed to provide an accurate full-scale reading when the current required to produce a full-scale reading is applied to the instrument.

However, in a preferred embodiment of the invention, an adjustable magnetic shunt is employed for full-scale calibration of the instrument. This shunt may be adjusted to shunt an adjustable amount of the magnetic flux passing between the pole pieces away from the air gap.

It is, therefore, an object of the invention to provide a moving-coil instrument having improved calibration facilities.

It is a second object of the invention to provide a moving-coil instrument having an air gap defined by spaced pole pieces and having a coil side disposed for rotation in the air gap, wherein the pole pieces are rotatably adjustable relative to each other for calibration purposes.

It is a third object of the invention to provide an instrument as set forth in the preceding paragraph wherein the axis of rotation is parallel to the axis of rotation of the coil side, the axes being spaced from each other along a line passing through a predetermined portion of the air gap corresponding to the full scale position of the coil side.

It is a fourth object of the invention to provide a moving-coil instrument having an adjustment for effecting a full-scale calibration of the instrument and having a further adjustment for adjusting the scale distribution of the instrument.

It is a fifth object of the invention to provide an improved method for calibrating a moving-coil instrument.

Figure 2:
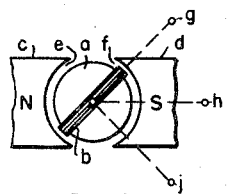
Figure 3:
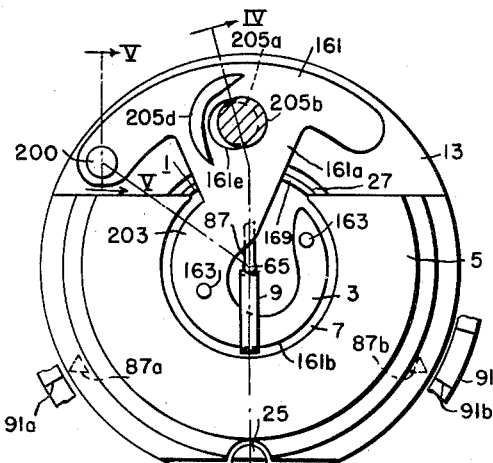
Figure 4:
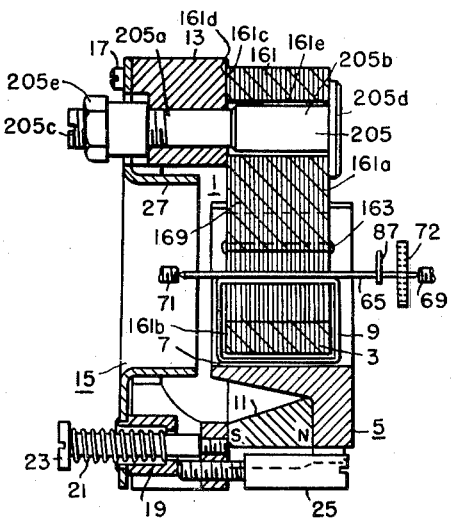
Figure 5:
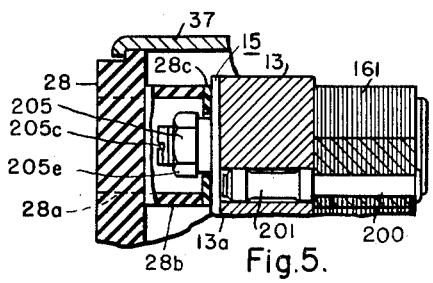

Other objects of the invention will be apparent from the following description taken in conjunction with the accompanying drawing, in which:

Figure 1 is a view in plan with parts omitted of a moving-coil instrument embodying the invention, Fig. 2 is a view in plan with parts omitted of a modified form of moving-coil instrument embodying the invention, Fig. 3 is a view in plan with parts broken away of a permanent-magnet moving-coil instrument embodying the invention, Fig. 4 is a view in section taken along the line IV—IV of Fig. 3, and Fig. 5 is a view in section taken along the line V—V of Fig. 3 with casing details added.

Referring to the drawing, Fig. 1 shows a moving-coil instrument wherein an annular core or inner pole piece A is located within the cylindrical opening of an outer pole piece B. These pole pieces may be constructed of soft magnetic material. They are spaced to define an annular air gap C within which one coil side of a coil D is positioned. The coil D is linked with the annular inner pole piece A and is secured to a shaft E for rotation about the axis of the shaft.

A source of magnetomotive force such as a permanent magnet or an electromagnet (not shown in Fig. 1) is connected between the pole pieces for the purpose of establishing a magnetomotive force therebetween. The resulting magnetic field in the air gap cooperates with current flowing through the coil D to establish a torque acting between the coil and the pole pieces. In a conventional instrument, this torque may be opposed by a control spring (not shown in Fig. 1) which biases the coil towards a zero or rest position. The components of Fig. 1 thus far described are well known in the art.

The scale distribution of the instrument or the uniformity of the movement of the coil relative to the magnitude of the current energizing the coil depends on the uniformity of the air gap C. In an effort to provide extremely accurate air gaps manufacturers of commercial instruments have established extremely close tolerances and the maintenance of these close tolerances has been a difficult and exacting task.

In accordance with the invention, the pole pieces are made adjustable relative to each other to facilitate calibration of the instrument. Let it be assumed first that the inner pole pieces A may be adjusted relative to the outer pole piece B in the direction of the arrow F. If the inner pole pieces is moved to the right, as viewed in Fig. 1, it follows that the right-hand portion of the air gap magnetic field is increased in magnitude whereas the left-hand portion is decreased in magnitude. This has the effect of expanding the scale for movement of the coil side through the right-hand portion of the air gap and of compressing the scale for movement of the coil side through the left-hand portion of the air gap.

As a further example, let it be assumed that the inner pole piece A may be adjusted in the direction of the arrow G. If the inner pole piece is moved upwardly as viewed in Fig. 1, it follows that the scale is compressed in the mid scale range and is expanded at the ends of the scale. Movement of the inner pole piece in a downward direction has the opposite effect. If the inner pole piece is adjustable in both of the directions defined by the arrows F and G, it follows that a substantial control of scale distribution is provided.

In a preferred embodiment of the invention, the adjustment of the pole pieces is effected by means of rotation. For example, let it be assumed that the inner pole piece A may be rotated relative to the outer pole piece B around an axis H which extends perpendicular to the plane of the drawing. Let it be assumed further that the axis H is parallel to the axis of rotation of the coil D, and that the axes are spaced along a line J which passes substantially through a predetermined portion of the air gap corresponding to the full-scale position of the coil D. By inspection of Fig. 1, it is clear that movement of the inner pole piece A about the axis H has little effect on the portions of the air gap through which the line J passes. Consequently, once the instrument has received its full-scale calibration, the inner pole piece A may be adjusted about the axis H with no substantial effect on the full-scale calibration. Movement of the inner pole piece A about the axis H tends to decrease the length of the air gap on one side of the line J and to increase the length of the air gap on the opposite side of the line J.

If the full-scale position of the coil D is at the opposite end of the air gap, the inner pole piece A may be mounted for adjustment about an axis K which is parallel to the axis of rotation of the coil D with the axes spaced along a line which passes substantially through the assumed full-scale position of the coil D.

For a center-zero instrument, the inner pole piece A may be adjustable about either of the axes H or K. However, if desired, the inner pole piece for a center-zero instrument may be made adjustable about an axis L. The axis L is parallel to the axis of rotation of the coil D, and the axes are spaced along a line passing through the mid-scale position of the coil D. Alternatively, the inner pole piece A may be made adjustable about any two or three of the axes.

In Fig. 2, a conventional moving-coil instrument is illustrated wherein two sides of a coil are located in air gaps. This instrument includes a magnetic core or inner pole piece unit $a$ which is surrounded by a coil $b$. Two pole pieces $c$ and $d$ are spaced from the core $a$ to define two air gaps $e$ and $f$. The coil $b$ has a separate coil side located in each of the air gaps.

The calibration of the instrument of Fig. 2 is not as susceptible as the instrument of Fig. 1 to the position of the core $a$ with respect to the associated pole pieces $c$ and $d$. If the core moves in a direction tending to strengthen the field for one of the coil sides, it simultaneously decreases the strength of the field for the remaining coil side. However, it is desirable that air gaps of minimum length be provided and that adequate mechanical clearance also be available. For these reasons, the core $a$ may be made adjustable with respect to the associated pole pieces $c$ and $d$. For exemplary purposes, the core $a$ may be made adjustable about any one or more of the axes $g$, $h$ or $j$. These axes are all parallel to and spaced from the axis of rotation of the coil $b$. Lines joining the axes $g$, $h$ and $j$ to the axis of rotation of the coil pass respectively through the coil $b$ when it occupies a first extreme position in its path of travel, through the coil $b$ when it occupies its mid-scale position and through the coil $b$ when it occupies its second extreme position in its path of travel.

The permanent-magnet moving-coil instrument of Figs. 3, 4 and 5 represents a preferred embodiment of the invention. This instrument includes a magnetic structure 1 having an inner magnetic core 3, which is part of an inner pole piece, and an outer magnetic pole piece 5. The magnetic pole pieces are spaced to define an air gap 7 within which one side of a coil 9 is disposed for rotation. It will be assumed for present purposes that the surfaces of the pole pieces which define the air gap are cylindrical.

A source of magnetomotive force is provided in the form of a permanent magnet 11. This magnet has the shape of a segment of a frustum of a right circular cone. One face of the permanent magnet engages a flange secured to the outer magnetic pole piece 5. The remaining pole face of the permanent magnet is connected through a magnetic ring 13 to the core 3.

The magnetic field produced in the air gap 7 is adjusted by means of a calibrator or magnetic shunt 15. One end of the magnetic shunt is secured to the magnetic ring 13 by means of suitable machine screws 17. A cup 19 is secured to the remaining end of the shunt for receiving a compression spring 21. The spring is compressed by a screw 23 which is in threaded engagement with the ring 13. The magnetic shunt is adjusted by operation of a machine screw 25 which is in treaded engagement with the ring 13 and which has an end in engagement with a wall of the cup 19. The shunt 15 has a cylindrical sleeve 27 which extends adjacent a surface of the outer pole piece 5.

The coil 9 is secured to a shaft 65 for rotation about the axis of the shaft with respect to the magnetic structure. The shaft may be mounted in suitable bearing screws 69 and 71. A pointer 87 is secured to the shaft 65 and cooperates with a scale on a rim 91. A control spring 72 is provided for biasing the coil 9 towards a predetermined zero or rest position with respect to the magnetic structure.

The magnetic core 3 forms a portion of a hook unit 161 which conveniently may be constructed of a plurality of laminations each similar in outline to the shape illustrated in Fig. 3. The laminations are secured together in any suitable manner as by adhesive or by rivets 163.

The hook unit 161 has a shank section 161$a$ and a hook section 161$b$. The hook section 161$b$ has a channel 169 through which the coil assembly including its support may be removed from the magnetic structure.

The components of Figs. 3, 4 and 5 thus far specifically mentioned correspond to components having the same reference characters which appear in the Thomander Patent 2,389,393 which issued November 20, 1945. Except for the differences herein specifically pointed out, the instrument illustrated in Figs. 3, 4 and 5 may be exactly similar to that illustrated in the Thomander patent. The screw 25 has a slightly different shape but serves the same purpose in the Thomander patent.

The outer pole piece 5, the ring 13, the shunt 15 and the hook unit 161 may be constructed of a soft magnetic material. The screws 23 and 25 may be constructed of a non-magnetic material such as brass. Suitable polarities for the permanent magnet 11 are represented by the conventional markings N for north pole and S for south pole.

It will be noted that the hook unit 161 has a plane face or seat 161c which engages a plane face or seat 161d on the ring 13. These seats are in a plane transverse to the axis of rotation of the coil 9.

The hook unit projects for a substantial distance around the ring 13 to receive a rivet 200. This rivet may aid in securing the laminations of the hook unit together. In addition, the rivet 200 has an extension 201 which forms a stud projecting into an opening 13a located in the ring 13. The opening 13a is a cylindrical opening and snugly receives the stud 201 to permit rotation of the hook unit relative to the ring about the axis of the rivet 200. By inspection of Fig. 3, it will be noted that a line 203 extending between the rivet 200 and the shaft 65 passes substantially through the full-scale position of the coil 9.

A stud or bolt 205 is provided for releasably clamping the hook unit 161 to the ring 13 and for facilitating adjustment of the hook unit relative to the ring 13. The bolt 205 has a cylindrical portion 205a which passes snugly through an opening in the ring 13. The bolt also has a cylindrical portion 205b which is positioned in an opening 161e in the hook unit 161. The axes of the portions 205a and 205b are parallel to each other but are spaced from each other by a small distance. In other words, the portion 205b is eccentrically mounted relative to the portion 205a. A screw driver slot 205c facilitates rotation of the bolt 205.

The opening 161e is elongated in a direction along the line connecting the bolt 205 and the rivet 200. This elongation permits rotation of the bolt relative to the ring 13 and the hook unit 161. By inspection of Fig. 3, it will be clear that rotation of the bolt 205 results in a small oscillatory movement of the hook unit 161 about the axis of the rivet 200. Consequently, rotation of the bolt 205 may be employed for adjusting the hook unit relative to the remainder of the magnetic structure.

The spacing of the axes of the portions 205a and 205b may be small enough to permit continuous rotation of the bolt. Such rotation provides a very fine and positive adjustment of the hook unit.

The bolt 205 also serves for clamping the hook unit 161 securely to the ring 13. To this end the bolt 205 is provided with a large head 205d which engages the exposed face of the hook unit 161. In addition, a nut 205e is in threaded engagement with the remaining end of the bolt. This nut engages the ring 13 and passes through an opening provided in the shunt 15. By inspection of Fig. 4, it is clear that when the nut 205e is rotated into firm engagement with the ring 13, the bolt 205 securely clamps the hook section 161 to the ring 13. The bolt may be constructed of magnetic or non-magnetic material, as desired.

It should be noted that adjustment of the hook unit relative to the ring 13 does not result in an opening of the magnetic circuit provided by the magnetic structure. The hook unit 161 has a large seat 161c in engagement with the ring 13. This engagement always provides a low reluctance path for magnetic flux passing between the ring 13 and the hook unit 161.

As shown in the aforesaid Thomander patent, the instrument movement normally is located within a suitable casing which includes a cylindrical shell 37 and a cylindrical base 28, portions of which are illustrated in Fig. 5. The casing provided in Fig. 5 may be identical with that illustrated in the Thomander patent, except that the base 28 is modified slightly to provide access to the screw driver slot 205c and to the nut 205e. It will be noted that the base 28 has an opening 28a for this purpose. The base also may have a tubular projection 28b of insulating material which surrounds the nut 205e. A suitable resilient gasket 28c such as one of cork, rubber or felt may be interposed if desired between the end of the tubular sleeve 28b and the ring 13 for the purpose of preventing the entry of dust into the casing.

The sequence of operations to be followed in calibrating the instrument illustrated in Figs. 3, 4 and 5 now will be discussed. It will be assumed initially that the instrument is of the left-zero type. When the pointer 87 is adjacent the position illustrated in dotted lines 87a in Fig. 3, it is adjacent a zero mark 91a on the scale. When the pointer is in the position illustrated by dotted lines 87b, it is adjacent a full-scale mark 91b. The instrument first may be adjusted to position the pointer in accordance with the dotted lines 87a when the coil 9 is deenergized. This adjustment is effected by means of the control spring 72 in the manner set forth in the aforesaid Thomander patent.

Next, the coil 9 is energized by a current which should move the coil to its full-scale position. In such position, the pointer should occupy the position illustrated by the dotted lines 87b. Should the pointer fail to occupy the position, the screw 25 is rotated to adjust the position of the shunt 15 until the pointer moves into the correct full-scale position. This shunt 15 operates in the manner discussed in the aforesaid Thomander patent.

In order to correct the scale distribution of the instrument, the coil 9 next is energized with a current which should move the coil to a mid-scale position. If the coil does not reach the correct position, the nut 205e is operated to release the clamping of the hook unit 161 to the ring 13. A screw driver next is inserted in the slot 205c and the bolt 205 is rotated until the correct mid-scale reading of the instrument is obtained. It will be recalled that such rotation of the bolt 205 operates to rotate the hook unit relative to the ring 13 about the axis of the rivet 200. Such rotation does not affect materially the predetermined portion of the air gap corresponding to the full-scale position of the coil 9. Consequently, the adjustment of the hook unit does not affect in any appreciable degree the full-scale calibration of the instrument. However, the rotation of the hook unit does modify appreciably the portion of the air gap corresponding to the mid-scale position of the coil 9 and such modification is employed for correcting the mid-scale reading of the instrument.

After a correct mid-scale operation is obtained, the nut 205e is operated to clamp the hook unit 161 securely to the ring 13. The instrument now has been calibrated to read correctly at three different points of its scale. Such calibration has been found ample for such instruments.

If the instrument of Figs. 3, 4 and 5 is of the center-zero type, as illustrated in the aforesaid Thomander patent, the pointer 87 should read zero on the associated scale when the coil 9 occupies the position illustrated in Fig. 3. Should the coil fail to occupy the correct position, the position of the spring 72 may be adjusted in the manner set forth in the Thomander patent for the purpose of correcting the zero reading of the instrument.

Current is now passed through the coil 9 which has a magnitude and a polarity which should move the pointer into the position represented by the dotted lines 87b. If the pointer fails to occupy the correct position the screw 25 may be operated to adjust the shunt 15 until the correct reading is obtained.

The coil 9 of the center-zero instrument next is energized with a current having a value and a polarity which should move the pointer into alignment with the mark 91a of the scale. If the coil 9 fails to occupy the correct position, the nut 205e is operated to release the clamping of the hook unit 161 to the ring 13. The bolt 205 next is rotated in order to move the hook unit relative to the ring 13 about the axis of the rivet 200 until the pointer occupies the position represented by the dotted lines 87a. Finally the nut 205e is operated to clamp the hook unit 161 securely to the ring 13.

It should be noted that the instrument illustrated in Figs. 3, 4 and 5, including its calibrating mechanism, is completely self-contained. Because of the provision of the various adjustments the tolerances required during manufacture of the instrument may be appreciably larger. Furthermore, the instrument may be calibrated not only in the factory but in the field. Since the calibration corrects the reading of the instrument for three spaced points on the scale, the scale distribution may be adjusted.

Although the invention has been described with reference to certain specific embodiments thereof, numerous modifications falling within the spirit and scope of the invention are possible.

I claim as my invention:

1. In an electroresponsive device, a magnetic structure comprising a magnetic core member, a pole piece member spaced from the core member for defining an air gap therebetween, and means for establishing a magnetomotive force between said members to provide a magnetic field in the air gap, a coil having a coil side in said air gap, means mounting the coil for movement about a first axis relative to the magnetic structure to carry the coil side through the air gap, and mechanism mounting one of said members for adjustable movement relative to the other of said members and relative to the first-named means about a second axis substantially parallel to the first axis, said coil side being substantially included in a plane defined by said axes when the coil side is substantially at one end of the path of its movement.

2. In an electroresponsive device, a magnetic structure comprising a magnetic core member, a pole piece member spaced from the core member for defining an air gap therebetween, and means for establishing a magnetomotive force between said members to provide a magnetic field in the air gap, a coil having a coil side in said air gap, means mounting the coil for movement about a first axis relative to the magnetic structure to carry the coil side through the air gap, mechanism mounting one of said members for adjustable movement relative to the other of said members and relative to the first-named means about a second axis substantially parallel to the first axis, said coil side being substantially included in a plane defined by said axes when the coil side is substantially at one end of the path of its movement, and releasable means for clamping the adjustable one of said members in any position of adjustment thereof.

3. In an electroresponsive device, a magnetic structure comprising a magnetic core member, a pole piece member spaced from the core member for defining an air gap therebetween, and means for establishing a magnetomotive force between said members to provide a magnetic field in the air gap, a coil having a coil side in said air gap, means mounting the coil for movement about a first axis relative to the magnetic structure to carry the coil side through the air gap, mechanism mounting one of said members for adjustable movement relative to the other of said members and relative to the first-named means about a second axis substantially parallel to the first axis, said coil side being substantially included in a plane defined by said axes when the coil side is substantially at one end of the path of its movement, and eccentric means operable for adjusting the adjustable one of said members about said second axis.

4. In an electroresponsive device, a magnetic structure comprising a magnetic core member, a pole piece member spaced from the core member for defining an air gap therebetween, and means for establishing a magnetomotive force between said members to provide a magnetic field in the air gap, a coil having a coil side in said air gap, means mounting the coil for movement about a first axis relative to the magnetic structure to carry the coil side through the air gap, mechanism mounting one of said members for adjustable movement relative to the other of said members and relative to the first-named means about a second axis substantially parallel to the first axis, said coil side being substantially included in a plane defined by said axes when the coil side is substantially at one end of the path of its movement, and an adjustable magnetic shunt for shunting magnetic flux between said members away from said air gap.

5. In an electroresponsive moving-coil instrument, a magnetic structure comprising an inner magnetic pole piece member, outer magnetic pole piece means substantially surrounding the inner magnetic member, and a source of magnetomotive force for establishing a magnetomotive force between said inner magnetic member and said outer magnetic means, said inner magnetic member and said outer magnetic means being spaced to define an air gap arcuate about a predetermined first axis, a coil having a coil side disposed in the air gap, means mounting the coil for rotation relative to the magnetic structure about said first axis to carry the coil side through the air gap, pivot means mounting the inner magnetic member for pivotal movement relative to the outer magnetic means and relative to said source of magnetomotive force about a second axis spaced from and parallel to said first axis, and a releasable clamping device for clamping the inner member relative to the outer magnetic means and relative to said source of magnetomotive force, said clamping device comprising a stud mounted for rotation relative to the outer magnetic means about a third axis spaced from and parallel to the second axis, said stud having an eccentric portion engaging the inner magnetic member for adjusting the inner member in response to rotation of the stud about the third axis, said stud having further headed means for releasably clamping the inner pole-piece securely in any position of adjustment thereof.

6. In an electroresponsive moving-coil instrument, a magnetic structure comprising an inner magnetic pole piece member, outer magnetic pole piece means substantially surrounding the inner magnetic member, and a source of magnetomotive force for establishing a magnetomotive force between said inner magnetic member and said outer magnetic means, said inner magnetic member and said outer magnetic means being spaced to define an air gap arcuate about a predetermined first axis, a coil having a coil side disposed in the air gap, means mounting the coil for rotation relative to the magnetic structure about said first axis to carry the coil side through the air gap, pivot means mounting the inner magnetic member for pivotal movement relative to the outer magnetic means and relative to said source of magnetomotive force about a second axis spaced from and parallel to said first axis, and a releasable clamping device for clamping the inner member relative to the outer magnetic means and relative to said source of magnetomotive force, said coil side being substantially included in a plane defined by said axes when the coil side is substantially at one end of the path of its movement.

7. In an electroresponsive moving-coil instrument, a magnetic structure comprising an inner magnetic pole piece member, outer magnetic pole piece means substantially surrounding the inner magnetic member, and a source of magnetomotive force for establishing a magnetomotive force between said inner magnetic member and said outer magnetic means, said inner magnetic member and said outer magnetic means being spaced to define an air gap arcuate about a predetermined first axis, a coil having a coil side disposed in the air gap, means mounting the coil for rotation relative to the magnetic structure about said first axis to carry the coil side through the air gap, pivot means mounting the inner magnetic member for pivotal movement relative to the outer magnetic means and relative to said source of magnetomotive force about a second axis spaced from and parallel to said first axis, and a releasable clamping device for clamping the inner member relative to the outer magnetic means and relative to said source of magnetomotive force, said coil side being substantially included in a plane defined by said axes when the coil side is substantially at one end of the path of its movement, said one end of the path representing the full-scale end of said path.

8. In an electroresponsive device, a magnetic structure comprising a magnetic core member, a pole piece member spaced from the core member for defining an air gap therebetween, and means for establishing a magnetomotive force between said members to provide a magnetic field in the air gap, a coil having a coil side in said air gap, means mounting the coil for movement about a first axis relative to the magnetic structure to carry the coil side through the air gap between full-scale and zero-scale positions, mechanism mounting one of said members for adjustable movement relative to the remainder of the magnetic structure about a second axis substantially parallel to the first axis, said axes defining a plane which intersects the full-scale position of said coil side, said one of said members and the remainder of the magnetic structure having engaging seats defining a plane of engagement of the seats transverse to said axes, and means releasably securing said one of said members to the remainder of the magnetic structure in any of a plurality of adjusted positions with said seats in engagement.

9. In an electroresponsive device, a magnetic structure comprising a magnetic core member, a pole piece member spaced from the core member for defining an air gap therebetween, and means for establishing a magnetomotive force between said members to provide a magnetic field in the air gap, a coil having a coil side in said air gap, means mounting the coil for movement about a first axis relative to the magnetic structure to carry the coil side through the air gap between full-scale and zero-scale positions, mechanism mounting one of said members for adjustable movement relative to the remainder of the magnetic structure about a second axis substantially parallel to the first axis, said axes defining a plane which intersects the full-scale position of said coil side, said one of said members and the remainder of the magnetic structure having engaging seats defining a plane of engagement of the seats transverse to said axes, and means releasably securing said one of said members to the remainder of the magnetic structure in any of a plurality of adjusted positions with said seats in engagement, said securing means comprising a bolt having eccentrically related portions positioned respectively in said one of said members and in the remainder of the magnetic structure, said bolt extending parallel to said axes through said seats at a position spaced from said axes.

10. In an electroresponsive device, a magnetic structure comprising a magnetic core member, a pole piece member spaced from the core member for defining an air gap therebetween, and means for establishing a magnetomotive force between said members to provide a magnetic field in the air gap, a coil having a coil side in said air gap, means mounting the coil for movement about a first axis relative to the magnetic structure to carry the coil side through the air gap between full-scale and zero-scale positions, mechanisms mounting one of said members for adjustable movement relative to the remainder of the magnetic structure about a second axis substantially parallel to the first axis, said axes defining a plane which intersects the full-scale position of said coil side, said one of said members and the remainder of the magnetic structure having engaging seats defining a plane of engagement of the seats transverse to said axes, means releasably securing said one of said members to the remainder of the magnetic structure in any of a plurality of adjusted positions with said seats in engagement, and an adjustable magnetic shunt for adjustably shunting away from the air gap magnetic flux passing between said members.

11. In an electroresponsive moving-coil instrument, a magnetic structure comprising an inner magnetic core member provided with a first arcuate surface, an outer magnetic member having a second arcuate surface, said outer member substantially surrounding the inner member with said arcuate surfaces spaced from each other to provide a substantially uniform air gap defining an arc of at least 180° about a first axis, and means for establishing a magnetomotive force between said members to provide a magnetic field in the air gap, a coil having a coil side disposed in the air gap, means mounting the coil for rotation relative to the magnetic structure about said first axis to carry the coil side through the air gap towards and away from a predetermined portion of the air gap wherein said coil side is at its full-scale position, and means mounting the inner member for movement relative to the outer member and said first-named means about a second axis spaced from the first axis, said inner member including a portion adjacent said predetermined portion of the air gap which is movable along a path corresponding substantially to said second arcuate surface to thereby prevent alternation of said predetermined portion of the air gap during movement of the inner member.

12. In an electroresponsive moving-coil instrument, a magnetic structure comprising an inner magnetic core member provided with a first arcuate surface, an outer magnetic member having a second arcuate surface, said outer member substantially surrounding the inner member with said arcuate surfaces spaced from each other to provide a substantially uniform air gap defining an arc of at least 180° about a first axis, and means for establishing a magnetomotive force between said members to provide a magnetic field in the air gap, a coil having a coil side disposed in the air gap, means mounting the coil for rotation relative to the magnetic structure about said first axis to carry the coil side through the air gap towards and away from a predetermined portion of the air gap wherein said coil side is at its full-scale position, and means mounting the inner member for movement relative to the outer member and said first-named means about a second axis spaced from the first axis, said first and second axes extending parallel to each other to define a plane which intersects said predetermined portion of the air gap, said inner member including a portion adjacent said first portion of the air gap which is movable along a path corresponding substantially to said second arcuate surface to thereby prevent alteration of said predetermined portion of the air gap during movement of the inner member.

13. In an electroresponsive device, a magnetic structure comprising a magnetic core member, a pole piece member spaced from the core member for defining an air gap therebetween, and means for establishing a magnetomotive force between said members to provide a magnetic field in the air gap, a coil having a coil side in said air gap, means mounting the coil for movement about a first axis relative to the magnetic structure to carry the coil side through the air gap towards and away from a rest position, a full-scale position spaced from the rest position and a third position spaced from the rest and full-scale positions, biasing means biasing the coil side toward said rest position, said biasing means being adjustable to calibrate said rest position, magnetic shunt means for shunting magnetic flux away from the air gap, said shunt means being adjustable for calibrating said full-scale position, and mechanism mounting one of said members for adjustable movement relative to the other of said members about a second axis parallel to the first axis for calibrating said third position, said axes defining a plane which intersects said full-scale position.

References Cited in the file of this patent

UNITED STATES PATENTS

| | | |
|---|---|---|
| 627,908 | Davis | June 27, 1899 |
| 1,031,408 | Zander | July 2, 1912 |
| 1,426,619 | Vawter | Aug. 22, 1922 |
| 1,597,327 | Obermaier | Aug. 24, 1926 |
| 1,952,160 | Faus | Mar. 27, 1934 |
| 2,205,309 | Riordan | June 18, 1940 |
| 2,221,643 | Lederer | Nov. 12, 1940 |
| 2,472,013 | Hansell | May 31, 1949 |
| 2,508,547 | Slonczewski | May 23, 1950 |
| 2,515,014 | Lamb | July 11, 1950 |
| 2,537,221 | Hickok | Jan. 9, 1951 |
| 2,560,879 | Lamb | July 17, 1951 |

FOREIGN PATENTS

| | | |
|---|---|---|
| 482,124 | Great Britain | Mar. 22, 1938 |
| 486,695 | Great Britain | June 9, 1938 |